May 7, 1957 T. S. VIEROW 2,791,188
DEPOSITING MACHINE
Filed Nov. 12, 1953 3 Sheets-Sheet 1
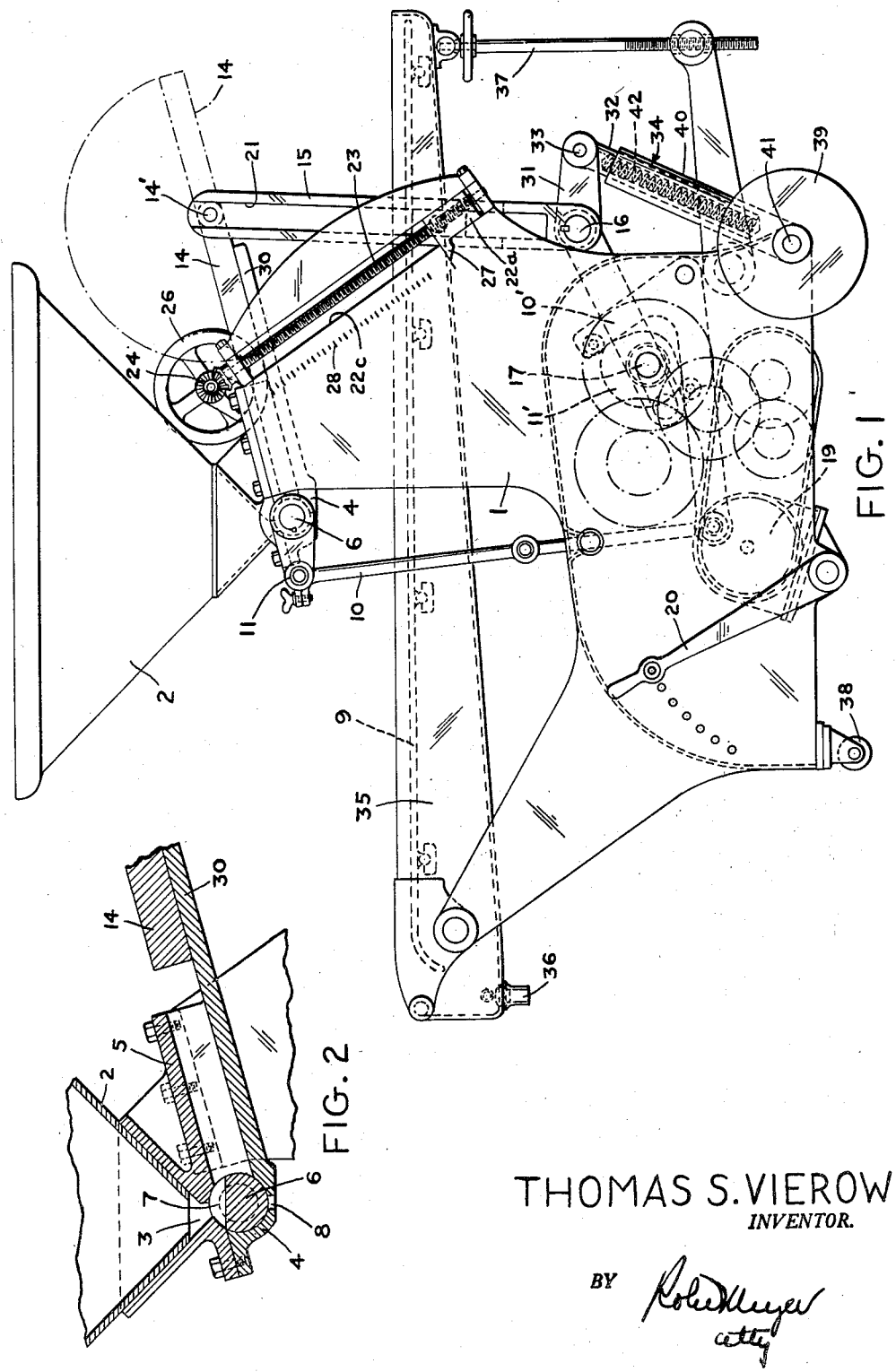
THOMAS S. VIEROW
INVENTOR.

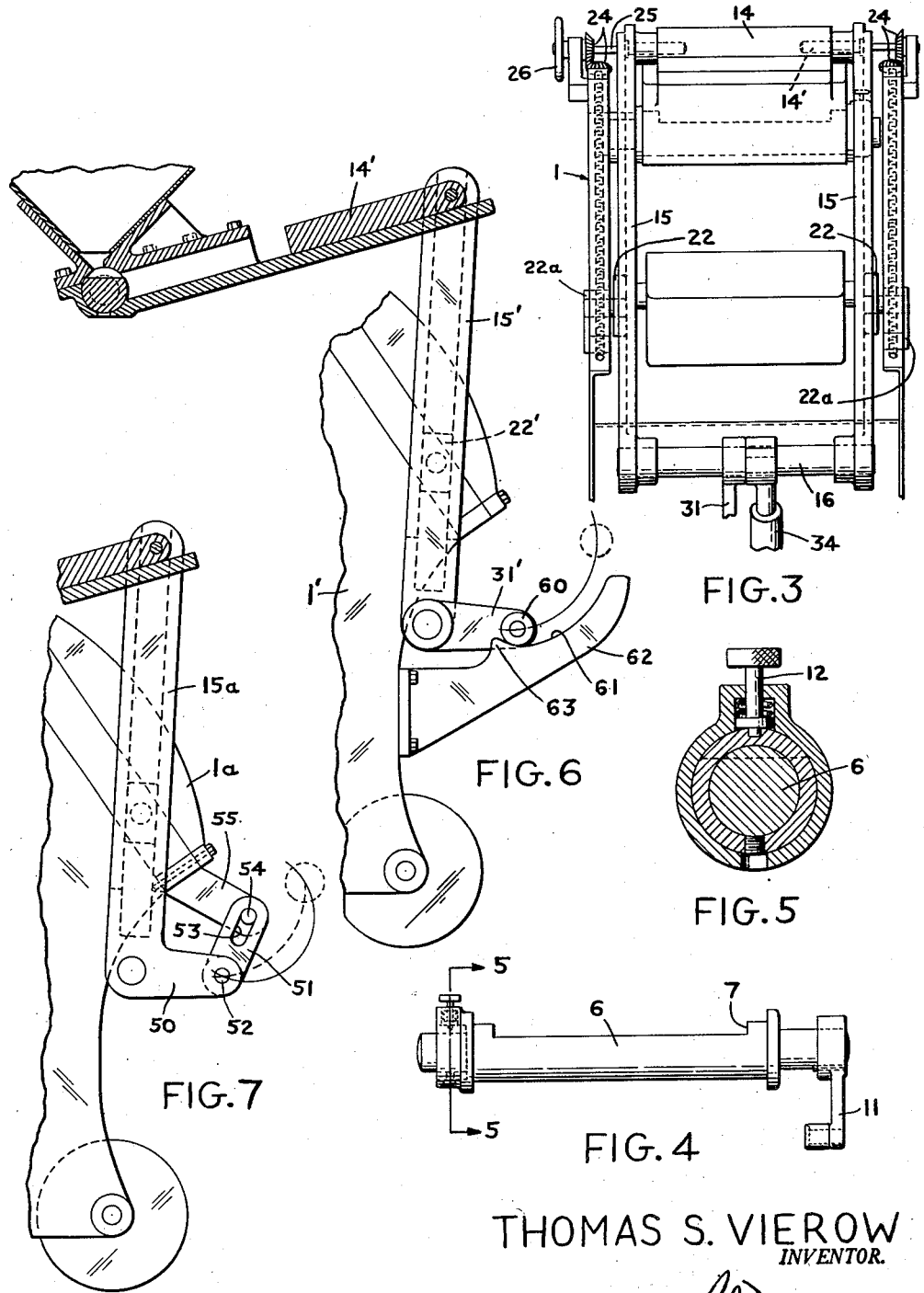

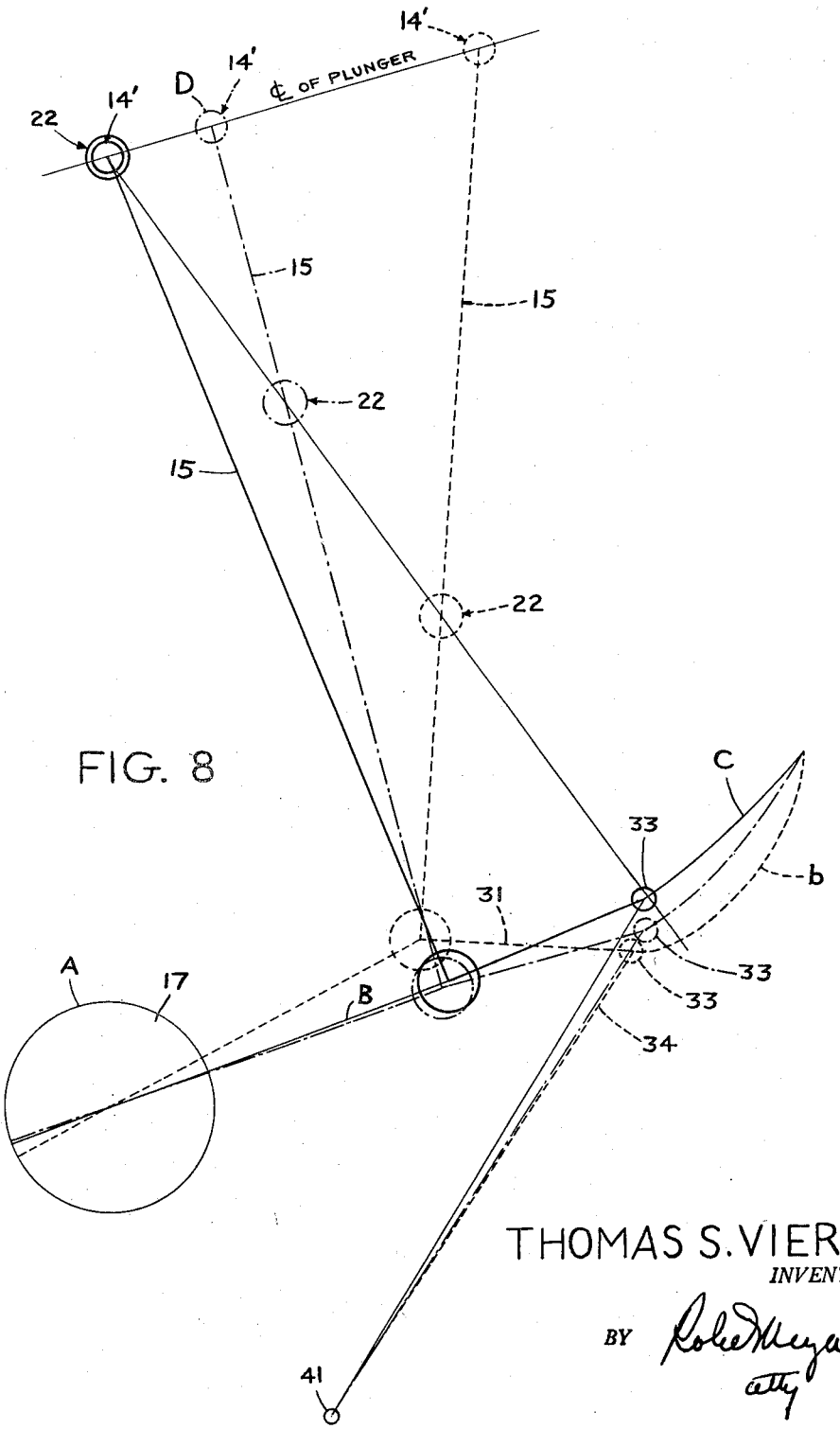

United States Patent Office 2,791,188
Patented May 7, 1957

2,791,188

DEPOSITING MACHINE

Thomas S. Vierow, Brooklyn, N. Y.

Application November 12, 1953, Serial No. 391,408

8 Claims. (Cl. 107—28)

This invention relates to machines for bakery and confectionery purposes, such as for measuring and depositing predetermined quantities of dough, either stiff dough such as used for baking bread or a comparatively thin dough or batter from which cakes, cookies or the like are made.

The present invention is an improvement on the structures disclosed in my prior Patent No. 1,477,857 issued December 18, 1923, and Patent No. 1,826,230 issued October 6, 1931, and relates primarily to a dough or batter depositing machine which will meet the requirements of Government health and sanitation authorities regarding food processing equipment and wherein the operation and functions of the machine are in keeping with well known and established practice, thereby eliminating expensive personnel training programs and material alterations in existing bakeries.

Another object of the present invention is to provide a dough measuring and depositing machine which will provide the food or baking industry simple effective means in scaling and depositing dough batter or the like from large batches in synchronized speed of operation of all features or operations of the machine to give improved flow of material and also to provide a depositing machine as specified wherein the containers for the dough, batter or the like move over a table or suitable supports carried by a "catch all" or catch basin for receiving waste material and water and detergent employed for cleaning the machine and which basin or tank is provided with a suitable disposal outlet.

The depositing machine of the present invention is constructed and arranged so that the means which govern the scaling and depositing of the product are also employed to make the product zone of the machine accessible to both sight and reach with any approved cleansing means by mere manual adjustment of the plunger stroke regulating means, whereby the elements of the product zone may be moved by power operation into cleansing position, or into operating position, without damage to any of the parts of the machine. This feature permits rapid relatively inexpensive cleaning of the product zone parts of the machine.

With these and other objects in view, as may appear from the accompanying specification, the invention consists of various features of construction and combination of parts, which will be first described in connection with the accompanying drawings, showing a depositing machine of a preferred form embodying the invention, and the features forming the invention will be specifically pointed out in the claims.

In the drawings:

Figure 1 is a side elevation of the improved depositing machine.

Figure 2 is a fragmentary section through the dough depositing mechanism.

Figure 3 is an end elevation partly broken away illustrating the mechanism for regulating the stroke operation of the dough moving plunger.

Figure 4 is an elevation of the dough deposit controlling valve showing it removed from the machine.

Figure 5 is a section on the line 5—5 of Figure 4.

Figure 6 is a fragmentary view partly in elevation and partly in section illustrating a second form of the mechanism for controlling the movement of the dough depositing plunger.

Figure 7 is a fragmentary view partly in elevation and partly in section of a further modified construction for controlling and guiding the movement of the dough-moving plunger.

Figure 8 is a diagram illustrating the movement of the plunger and its cooperating elements.

Referring more particularly to the drawings, the improved dough depositing machine includes a supporting frame 1 at the top of which is supported a hopper 2 into which a batch of dough to be deposited is placed. The hopper 2 opens through an opening 3 into the interior of a valve housing 4 which is formed with a cylinder structure 5 and opens into the cylinder structure as clearly shown in Figure 2 of the drawings. A rotary valve 6 is interposed in the valve chamber 4 and is rotated therein in the manner hereinafter described to control the dispensing of predetermined quantities of dough from the batch in the hopper 2.

The valve 6 is of the cylindrical type having a portion 7 thereof cut away to permit the dough to pass into the cylinder 5 from the hopper and be ejected from the cylinder 5 through the outlet opening 8 into suitable pans (not shown) carried on the pan support 9. The rotary valve 7 is connected to its operating rod 10 by an arm 11. The operating rod 10 has a cam arm 10' connected thereto which is engaged by a cam 11'. The cam 11' is rotated by the crankshaft 17 which is hereinafter described operates the dough dispensing reciprocating plunger 14 so that the plunger 14 and the valve 6 are synchronized in their operation to provide the proper dispensing of the dough. The valve 6 is removably held in the valve housing 4 by a spring controlled locking pin 12 shown specifically in Figure 5 of the drawings so that the valve may be easily and quickly removed for cleaning the machine, as will be hereinafter referred to.

The dough is drawn into the cylinder 5 and expelled or extruded therefrom by a reciprocating plunger 14 which is rectangular-shaped in cross section and is pivotally supported as shown at 14' by a pair of spaced operating arms 15 which are in turn connected to a rocking shaft 16. The rocking shaft 16 is operated by a crank shaft 17 to rock the plunger operating arms 15 and reciprocate the piston 14 so that on the outward movement of the piston 14 with the valve 6 in the position shown in Figure 2 of the drawings the dough will be drawn from the hopper 2 into the cylinder 5 and on a reverse movement of the piston the valve 6 will be synchronously rotated so that the cut out portion 7 will establish communication between the interior of the cylinder 5 and the outlet opening 8 so that the inwardly moving piston will force the dough out of the cylinder through the opening 8 into a suitable pan or container (not shown). The valve 6 is rotated in synchronism with the reciprocatory movement of the piston 14 through the operating mechanism above described and shown in dot and dash lines of Figure 1 of the drawings and the speed of operation of the piston 14 and valve 6 is controlled by tilting the operating motor 19 through the medium of an operating handle 20.

It is desirable, of course, to regulate the quantity of dough to be deposited on each stroke of the piston 14 depending upon the product being produced and to provide for this varied stroke of the piston 14 the arms 15 are slotted as shown at 21 and fulcrum blocks 22 are slidably mounted in the slots 21. The fulcrum blocks 22 are moved in the slots 21 by means of fulcrum slide blocks 22a which are slidably mounted in slots 22c in the frame 1. Feed screws 23 are connected to the fulcrum slide blocks 22a and they are connected through the medium of beveled gears indicated at 24 to an operating rod 25 which is manually operated by a handwheel 26 to vary the position of the fulcrum blocks 22 along the arms 15 and consequently vary the stroke of the piston upon the operation or rocking of the arms 15. A suitable indicator 27 is connected to one of the fulcrum slide blocks 22a and cooperates with a scale 28 on the supporting frame 1 to indicate the position of the fulcrum blocks 22 and facilitate the adjustment of the stroke of the piston 14.

It is highly desirable from sanitary reasons and for the purpose of meeting the requirements of government health and sanitation authorities that the present dough depositing machine be thoroughly cleansed after each operation and the present depositing machine is so constructed and arranged as to permit thorough and complete cleansing of all dough-contacting parts of the machine either when stationary or in operation.

To permit such cleaning, without disassembling the machine, the dough contacting parts of the machine are moved into cleansing position by the same mechanism which operates them during productive operation.

In describing operation of the machine, reference will be had to the diagram of Figure 8 of the drawings.

The arm 31 is rigidly connected to the lower ends of the operating arms 15 through the rocking shaft 16, and extends substantially at right angles thereto. The arm 31 is pivotally connected at 33 with the plunger 32 of the spring pressed cylinder and piston structure 34. The cylinder 40 is connected to the frame 1 at 41.

When the fulcrum blocks 22 are manually adjusted by means of the fulcrum sliding blocks 22a, feed screws 23 and the hand wheel 26 to their maximum upward limit, that is when the fulcrum center 22 shown in solid lines in Figure 8 coincides with the pivotal center 14' of the plunger, the plunger will not reciprocate, and the machine will operate idly, that is, without depositing any dough.

The throw of the crankshaft describes the circle A (see Figure 8) and the connecting rod B is hinged or pivoted to the lower end of the arms 15, thus with the setting of the fulcrum blocks 22, just above described, i. e., with the fulcrum point coinciding with the pivotal point 14' of the plunger 14, the revolving of the crank shaft will cause the pin 33 to describe the arc C shown in solid lines in Figure 8 of the drawings showing that there would be no movement of the plunger 14.

When the fulcrum blocks 22 are set at an intermediate position, as shown in dot and dash lines in Figure 8, the revolving of the crank shaft will move the plunger from the point D to the zero point, i. e., its innermost limit of movement for discharging the quantity of dough determined by such setting. As the fulcrum blocks 22 are shifted further away from the centerline of the plunger, the stroke of the plunger will be increased, increasing the quantity of dough deposited, until such time as the fulcrum blocks 22 are shifted to their maximum lower position at which time the plunger will be completely moved out of the cylinder and may be swung into inoperative position for thorough scrubbing and cleaning of the cylinder and plunger.

When the fulcrum blocks 22 are moved into their lowermost position as indicated by dotted lines in Figure 8 of the drawings rotation of the crank shaft 17 and consequent operation of the parts will move the point 33 along the dotted curve b and move the plunger 14 beyond its normal operating position to its outermost position and off of the supporting extension 30 formed upon the cylinder 5. At this point the plunger 14 is then in cleaning position and the cushioning and supporting effect of the piston and cylinder or shock absorber 34 becomes effective as the crank shaft pin pulls the rocking shaft 16 towards the crankshaft, and the weight of the plunger 14 arms 15 and companion parts will be transmitted to the structure 34 and frame 1.

When the fulcrum blocks are in position between minimum and maximum plunger movement-providing positions the piston 32 merely reciprocates idly in the cylinder 40 and the spring 42 which engages the position serves to cushion abrupt sharp movements of the arms 15, etc.

Positioned beneath the outlet 8 is a "catch all" or catch basin 35, preferably of stainless steel which is open at the top to receive waste and water and detergent used in cleaning the dough-contacting parts of the machine. This basin serves as a support or means of carrying pan supports 9. A suitable drain or disposal outlet 36 is provided for the basin 35 and the level of the basin may be varied by adjustment of the adjusting rod 37.

Wheels or castors 38 and 39 may be attached to the frame 1 for the purpose of facilitating the movement of the machine from one place to another, it being understood that the machine is used near an oven and washed or cleaned where there is a suitable floor drain.

Figure 6 of the drawings shows a modified form of the invention. In this figure the plunger 14' is pivotally connected to the operating side arms 15' in the same manner as shown and described in connection with Figure 1 of the drawings and the side arms have an arm 31' rigidly connected thereto at their lower ends. The arm 31' has a roller 60 carried thereby which rises over the arcuate guiding surface 61 of the guide 62. The guide 62 is rigidly attached to the frame 1' of the machine and the roller 40 engages a riser 63 formed at one end of the arcuate surface 61 to support the plunger operating mechanism and take the weight of the operating mechanism off the plunger in the same manner as the cylinder and piston structure 34 provides support when the fulcrum blocks are adjusted to provide maximum plunger movement, but operating idly during normal operation of the machine. It is understood, of course, that the arms 15' are mounted on fulcrum blocks 22' which correspond to the fulcrum blocks 22 and that in all other respects the machine is the same as described in connection with Figure 1 of the drawings.

Figure 7 of the drawings shows a further modification of the invention. In this form of the invention the plunger operating arms 15a are similarly L-shaped and accordingly include an arm or arms 50 connected to their lower ends and extending at right angles thereto as do the arms 31 and 31' in the preferred form of the invention. The second arms 51 are pivotally connected as shown at 52 to the arm or arms 50. The arm or arms 51 are provided with slots 53 in which ride a pin 54. The pin 54 is carried by an arm 55 which is rigidly connected to the supporting frame 1a of the machine and thus by movement of the slotted arms 51 over the pin 54 in companion function to the movement of the piston 32 in the cylinder 40, the weight of the plunger, arms 15a and their companion parts is distributed to the machine frame, when the fulcrum blocks are adjusted to provide maximum plunger movement.

It will be understood that the invention is not to be limited to the specific construction or arrangement of parts shown, but that they may be widely modified within the invention defined by the claims.

What is claimed is:

1. In a depositing machine, a cylinder, a supporting frame, a plunger in the cylinder for drawing dough into and extruding it from the cylinder, a supporting guide for said plunger connected to said cylinder and having a plunger supporting extension thereon for supporting the plunger when withdrawn from the cylinder during normal operation of the machine, an operating arm pivotally connected to said plunger, a fulcrum for said arm, means for operating said operating arm, means to adjust the fulcrum along the said operating arm to regulate the scope of movement of the plunger, and permit complete removal of the plunger from the cylinder and off of said supporting guide extension, an arm rigidly connected to said operating arm, means connected to said operating arm which acts to maintain the plunger in its plane of movement and moves into plunger weight supporting position when said plunger moves out of said cylinder and off of said supporting guide extension into cleansing position, said last named means including an element connected to said operating arm and a second element connected to said first element and said supporting frame to distribute stress from the weight of the plunger to the frame when the plunger is in cleansing position.

2. In a depositing machine comprising a supporting frame, a dough receiving cylinder, a plunger in the cylinder for drawing dough into and extruding it from the cylinder, a supporting guide for said plunger connected to said cylinder and having a plunger supporting extension thereon for supporting the plunger when withdrawn from the cylinder during normal operation of the machine, an operating arm pivotally connected to said plunger, a fulcrum for said operating arm, means for operating said operating arm, means to adjust the fulcrum along said operating arm to regulate the scope of movement of the plunger, said fulcrum adjustable to permit complete removal of the plunger from the cylinder and off of said supporting guide extension, an arm rigidly connected to said operating arm, and means connected to said rigid arm for distributing stress occasioned by weight of said plunger and its operating arm to said frame when said plunger is moved entirely out of the cylinder and off of said supporting guide extension.

3. In a depositing machine, a supporting frame, a cylinder, a plunger for drawing dough into and extruding it from said cylinder, a supporting guide for said plunger connected to said cylinder and having a plunger supporting extension thereon for supporting the plunger when withdrawn from the cylinder during normal operation of the machine, an operating arm pivotally connected to said plunger, a fulcrum for said arm, means for operating said operating arm, means to adjust the fulcrum along said operating arm to regulate the scope of movement of the plunger and permit removal of the plunger from the cylinder onto said supporting extension, said plunger movable pivotally upon its pivot to said operating arm to move the plunger off said extension for cleansing of the plunger and cylinder, plunger supporting means including said plunger operating arm and a first element rigidly connected to the plunger operating arm, and a second element connected to said supporting frame and engaging and supporting said first element to distribute stress from the weight of the plunger to the frame.

4. A depositing machine as claimed in claim 3 wherein said supporting and stress absorbing means includes an arm rigidly connected to said operating arm, a roller carried by said rigid arm, and a rigid combined guide and stress distributing support embodying a roller guiding cam surface engaged by said roller and rigidly attached to said frame.

5. A depositing machine as claimed in claim 3 wherein said supporting and stress absorbing means includes, a rigid arm connected to said operating arm, an arm pivotally connected to said rigid arm, an arm bracket rigidly supported on the frame, and a slot and pin connection between said pivoted arm and said arm bracket.

6. A depositing machine as claimed in claim 3, including cushioning means interposed therein between the operating arm and frame for cushioning abrupt movement of said plunger operating arm during normal operation of the depositing machine.

7. A depositing machine as claimed in claim 3, including an arm rigidly connected to said operating arm, a second cylinder connected to said frame, and a piston in said second cylinder and pivotally connected to said arm.

8. A depositing machine as claimed in claim 3, including a cushioning spring in said second cylinder and engaging said piston to cushion abrupt movement of said operating arm during normal operation of the depositing machine.

References Cited in the file of this patent

UNITED STATES PATENTS

| 1,440,715 | Bliss | Jan. 2, 1923 |
| 1,477,857 | Vierow | Dec. 18, 1923 |
| 1,826,230 | Vierow | Oct. 6, 1931 |
| 1,839,731 | Baum | Jan. 5, 1932 |
| 2,076,284 | Vierow | Apr. 6, 1937 |
| 2,080,298 | Bagby | May 11, 1937 |

FOREIGN PATENTS

| 45,968 | Netherlands | June 15, 1939 |